United States Patent [19]

Chu

[11] Patent Number: 4,912,460

[45] Date of Patent: Mar. 27, 1990

[54] ELECTROSTATICALLY ACTIVATED GATING MECHANISM

[76] Inventor: John Chu, 22997 Standing Oak Court, Cupertino, Calif. 95014

[21] Appl. No.: 272,217

[22] Filed: Nov. 16, 1988

Related U.S. Application Data

[63] Continuation-in-part of Ser. No. 74,261, Jul. 16, 1987, abandoned, which is a continuation-in-part of Ser. No. 914,081, Oct. 6, 1986, abandoned, which is a continuation-in-part of Ser. No. 790,350, Oct. 23, 1985, abandoned.

[51] Int. Cl.[4] .............................................. H04Q 9/00

[52] U.S. Cl. ........................ 340/825.310; 340/825.56; 341/34; 310/330

[58] Field of Search ........... 340/825.3, 825.31, 825.56; 361/172; 70/278; 235/382; 341/20, 34; 310/309, 311, 328, 330, 332

[56] References Cited

U.S. PATENT DOCUMENTS

| | | | |
|---|---|---|---|
| 4,190,785 | 2/1980 | Kompanek | 310/330 |
| 4,197,524 | 4/1980 | Salem | 340/825.31 |
| 4,396,914 | 8/1983 | Aston | 340/825.31 |
| 4,433,355 | 2/1984 | Chew et al. | 361/172 |
| 4,485,381 | 11/1984 | Lewiner et al. | 340/825.31 |
| 4,511,946 | 4/1985 | McGahan | 340/825.31 |

FOREIGN PATENT DOCUMENTS

| | | | |
|---|---|---|---|
| 8002710 | 11/1980 | World Int. Prop. O. | 340/825.31 |

OTHER PUBLICATIONS

"Rotational Pieloelectric Actuator", IBM Technical Disclosure Bulletin, vol. 31, No. 8, Jan, 1989, (no author).

*Primary Examiner*—Donald J. Yusko
*Assistant Examiner*—Edwin C. Holloway, III
*Attorney, Agent, or Firm*—Fliesler, Dubb, Meyer & Lovejoy

[57] ABSTRACT

An electromechanical gating mechanism comprises an electrical energy generating system for generating electrical energy in response to and utilizing energy derived from mechanical motion consciously generated by an intelligent agency. An electronic decision making apparatus is solely powered by the electrical energy generated by the electrical energy generating device. The decision making apparatus, which may include a non-volatile memory, is adapted to receive information, to make one of a set of possible decisions based on the information and on its logic and/or data in its memory and to generate a specific low power electrical output in response to a selected one of the set of possible decisions being made. A mechanical gate has at least two positions. An electrical to mechanical energy conversion device serves for converting electrostatically the low power electrical output into a minute mechanical force/movement and for applying the minute mechanical force/movement to position the gate in a selected one of its positions. An apparatus as set forth above does not require a separate power source, be it a battery or access to AC power. Thus wiring and installation costs are significantly reduced.

22 Claims, 7 Drawing Sheets

ELECTROSTATICALLY ACTIVATED GATING MECHANISM

CROSS-REFERENCE

This application is a continuation-in-part of co-pending application Ser. No. 74,261 filed July 16, 1987 now abandoned, which is a continuation-in-part of co-pending application Ser. No. 914,081 filed Oct. 6, 1986, now abandoned, which is a continuation-in-part of co-pending application Ser. No. 790,350 filed Oct. 23, 1985, now abandoned.

TECHNICAL FIELD

The invention relates to an electrostatically activated gating mechanism such as a lock mechanism wherein a user inserts a key, mechanical or electronic, or enters a code via push-buttons, a touch-pad or the like, or provides biometric information by speaking to provide a voice print, by placing a finger on a sensor to provide a fingerprint, or by placing an eye in position for a retinal pattern to be obtained, an electronic decision making apparatus such as a microcomputer decides whether the key, code, etc., is correct, and a function is allowed to be performed only if the key, code, etc., is correct.

BACKGROUND ART

A number of sophisticated electronic lock systems have been developed over the past several years. In such systems the user inserts a key, often in the nature of a plastic card having an identifying code magnetically or optically stored thereon, into a slot. The code is read and if the code is correct powered electrical/electronic apparatus will perform such functions as raising a bar to allow a car to drive into a garage, asking the cardholder to enter data onto a keyboard or a touch pad as in automatic teller machines, allowing the user to turn a handle to enter a hotel room, etc.

Each of the above discussed prior art systems requires an external power source to run the electronics, lift the bar, draw the bolt, etc. As a result, a good deal of the cost of such systems is in wiring the mechanism to be operated and the electrical/electronic apparatus for receipt of electrical power. This is perhaps not a great problem when the power is being used to control entry to a garage. On the other hand, when it is being used for the purpose of controlling entry to a hotel room, each door of the hotel must be wired to receive power or must contain a battery power service. This is a quite expensive operation and has greatly limited the use of such sophisticated electronic locking systems.

Also, there are some instances where it is simply inconvenient to carry a portable power supply, even a battery. For example, if one is fishing in a mountain stream it is desirable to be able to adjust the tension in the line in order to properly play a fish. Present day nonelectronically controlled reels provide this capability utilizing a ratchet type of system. However, the effective amount of resistance to the fish's struggles varies dependent on how much of the line is paid out since the effective diameter, from the center of the reel to the point at which the line leaves the reel, varies. A system which would instantaneously measure the amount of pull being exerted by a fish and which would adjust the tension accordingly would be desirable. Providing such a currently non-existant system, using present day technology, would require the installation of a battery and proper connections within the reel.

Some attempts have been made to utilize in-the-door power generation to eliminate the need for an external power source. German Offenlegungsschrift No. 2,324,392, PCT International Publication Number WO 80/02710 and U.S. Pat. No. 4,433,355 all show the use of in-the-door electrical generators to power electronic decision makers and to move bolts or gates which allow latches to be moved. All of such apparatus, however, utilize magnetic fields (e.g., solenoids) which require that an electric current be sustained in their coils whereby power is continuously consumed. Thus, such apparatus requires the generation of considerable power. And, to generate such power various gearing must be provided along with springs, etc. Furthermore, the generation of such power requires considerable movement, such as cranking and can generate considerable noise as gears move against one another, springs are loaded and their energy discharged to power a generator, the generator spins, etc. To date such problems have precluded the successful entry of any such apparatus into commercial acceptance.

DISCLOSURE OF INVENTION

The present invention is directed to overcoming one or more of the problems as set forth above.

In accordance with the present invention an electrostatically activated gating mechanism is set forth. The mechanism includes electrical energy generating means for generating electrical energy in response to and utilizing energy derived from mechanical motion consciously generate by an intelligent agency. An electronic decision making apparatus solely powered by the electrical energy generated by the electrical energy generating means is adapted to receive information, to make one of a set of possible decisions based thereon, and to generate a specific low power electrical output in response to a selected one of the set of possible decisions being made. A mechanical gate having at least two positions serves as a part of the mechanism. Electrical to mechanical energy converting means serve for electrostatically converting the low power electrical power output into a minute mechanical force/movement and for applying the minute mechanical force/movement to position the gate in a selected one of the positions.

Electrostatic forces, such as electrostatic attraction/-repulsion or piezoelectric material flexure are in general weak forces as comapred to electromagnetic forces and therefore such forces are not commonly exploited to do mechanical work. Because of the extremely low power consumption required to set up electrostatic attraction/-repulsion or piezoelectric material flexure such forces are of great importance to the present invention.

An electronic system will generally cease to function when its power source fails. A gating mechanism in accordance with the present invention does not suffer from this problem. The design utilizes very low power electronics such as those utilized in electronic watches and solar cell powered calculators. Such electronics can perform very complex tasks with extremely low power consumption. Thus, for example, if one wishes to provide hotel room security by providing a touch pad or keyboard on the door of each hotel room nd giving each user a selected code to enter on the touch pad or keyboard in order to accomplish entry into the room, such can be accomplished without wiring the door for power. The energy needed for energizing the gate is electrostatic and low and does not need to be constantly applied whereby a user is not required to exert any more effort than is presently used in gaining access through a door. The savings in installation costs are so great, along with the quiet operation, as to make such systems practical for almost all hotel rooms.

BRIEF DESCRIPTION OF DRAWINGS

The invention will be better understood by reference to the figures of the drawings wherein like numbers denote like parts throughout and wherein.

BEST MODE FOR CARRYING OUT THE INVENTION

Figure 1A:
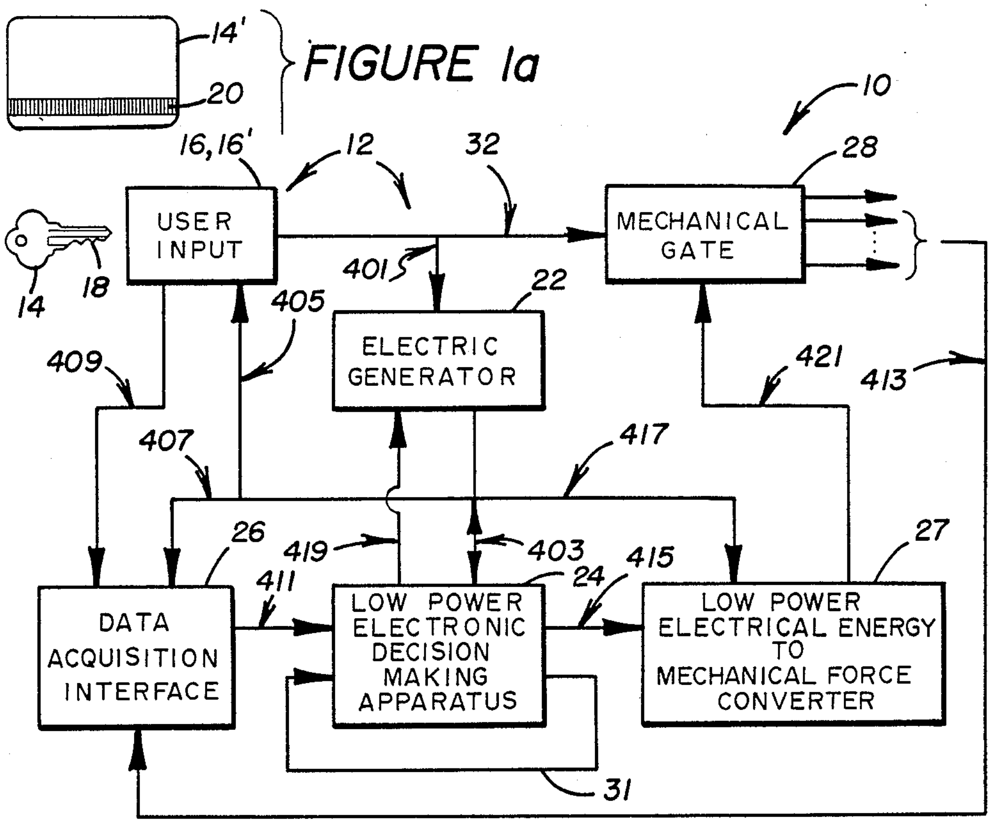
FIGS. 1*a* and 1*b* illustrate, in block diagram form, alternate embodiments of the present invention.
Figure 1B:
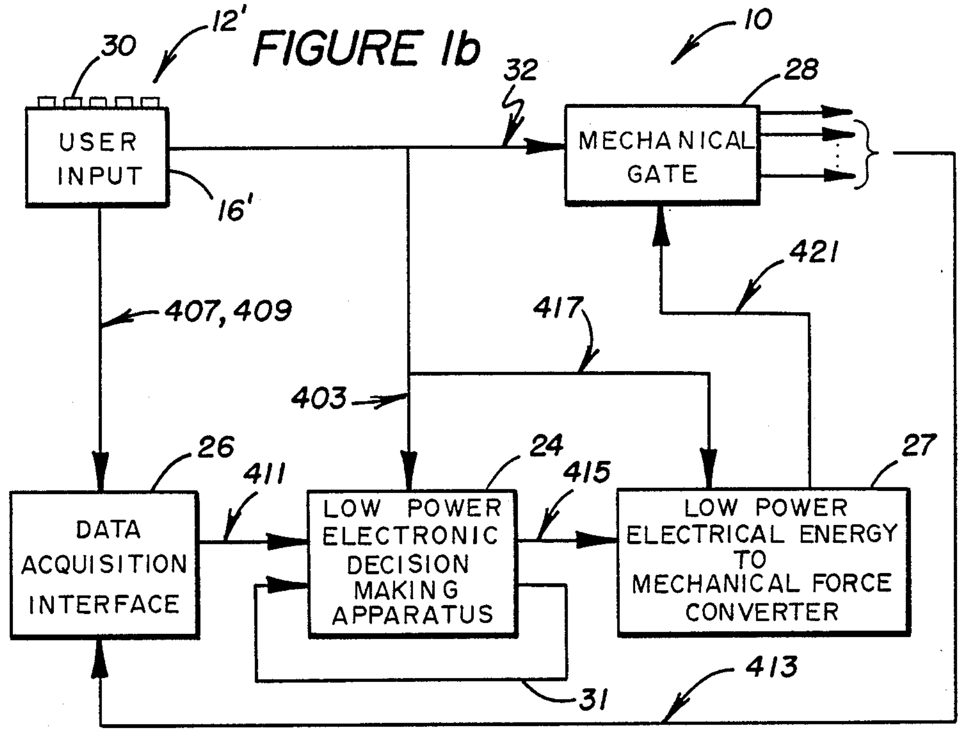
Figure 2:
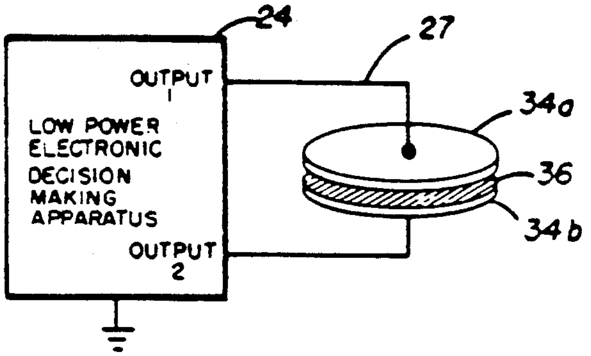
FIGS. 2 illustrates yet another embodiment of the present invention.

An electrostatically activated gating mechanism 10 in accordance with the present invention is illustrated in FIGS. 1*a* and 1*b*. Electrical energy generating means 12 or 12' is shown which serves for generating electrical energy in response to and utilizing energy derived from mechanical motion consciously generated by an intelligent agency. The mechanical motion which leads to the generation of electrical energy may be in a pushing of a key 14 or 14' into a lock 16 or 16' which serves as mechanical motion detecting means. The key 14, for example, includes mechanical coding thereon in the nature of the shape and positioning of the various teeth 18. The key 14' includes electronic coding thereon, for example magnetically stored information stored on a strip 20. Alternatively, optical coding such as bar codes, holes in cards, or the like, may be used to store the information on the key 14'. The mechanical motion is that of shoving the key 14 or 14' into the lock 16 or 16' which can, for example, turn a wheel (such as gear 507 in FIG. 10) through frictional contact, move a lever, move a rack which in turn rotates a gear etc. This mechanical motion is utilized to, as represented by line 401 power (power and decision transmission is illustrated representationally by connecting lines ending in arrowheads in FIGS. 1*a* and 1*b* an electric generator 22 (which can be of a light construction because of the minute energy requirement and, hence, can be quiet and can be operated by relatively slight mechanical motion) which in turn powers, as represented by line 403, an electronic decision making apparatus 24 such as an appropriately designed integrated circuit which may include a nonvolatile memory. The user input 16,16' and a data acquisition interface 26 (one embodiment of which is the magnetic reading head 505 in FIG. 10) are also powered by the electric generator 22 as represented, respectively, by lines 405 and 407 (one embodiment of which is the wires 509 in FIG. 10). The electric generator 22 can be, for example, of the construction in FIG. 5 and can be activated (spun) using the mechanical motion of the key 14 or 14' through wheels, levers, rack and the like.

Figure 11:
FIG. 11 illustrates an electronic code in the form of a pulse train.

Information is received by the electronic decision making apparatus 24 from the user input (lock) 16 or 16', as represented by lines 409 and 411 (one embodiment of which is the wires 511 in FIG. 10), via an appropriate data acquisition interface 26 which converts the user input into an electronic code (such as the pulse train 513 in FIG. 11) readable by the electronic decision making apparatus 24. The information would be, for example, whether the key 14 has properly shaped and/or positioned teeth 18 or whether the strip 20 has a proper magnetic or other code on it or whether the proper code has been entered on the buttons 30 of FIG. 1*b*.

The electronic decision making apparatus 24, based upon the data which it receives via the data acquisition interface 26, and upon the contents of the memory if it includes a memory, selects one of a set of possible decisions and generates a specific low power electrical output when a selected one of the set of possible decisions has been made.

A feedback loop 31 can be included in the low power electronic decision making apparatus 24 to make it a general "state machine" as required in certain applications in which the output response depends on the previous state the system is in, e.g., the insertion of the first key sets up the state in which a second key is read before effecting any unlocking, as in the case of the lock on a safety deposit box in a bank or hotel. The feedback loop 31, in the aforementioned case, provides the low power electronic decision making apparatus 24 with the information whether the first key which has been inserted is correct so that it can proceed to the next stage and process the data from the second key. The state machine will not be complete without the additional feedback path represented by line 413 from the outputs of the mechanical gate 28 to the data acquisition interface 26. The additional feedback loop 413 serves to inform the low power electronic decision making apparatus 24, via the data acquisition interface 26, about which one o a set of positions (such as one of many gear settings in a bicycle) the mechanical gate 28 is in, so that the low power electronic decision making apparatus 24 can reach a next decision based on the "state" of the system.

Electrical to mechanical energy converting means 27 serves for electrostatically converting the low power electrical output from the electronic decision making apparatus 24, as represented by line 415, and any additional energy from the electric generator 22, as represented by line 417, as controlled by the electronic decision making apparatus 24, as represented by line 419, into a minute mechanical force/movement and for applying the aforementioned minute mechanical force/-movement, as represented by line 421, to position a mechanical gate 28, having at least two positions, into a selected one of such positions. When the mechanical gate is in the selected one of the positions specific mechanical work corresponding to a specific position can be performed by the user through the mechanical gate 28 via line 32.

FIG. 1*b* illustrates an embodiment of the invention wherein an electric generator 22 is not needed. Instead, alternative electrical energy generating means 12' is utilized. In the embodiment of FIG. 1*b* the alternate electrical energy generating means 12' may comprise a series of buttons or touch pad areas 30 which serve two functions. First, they detect mechanical motion and generate energy piezoelectrically, which electrical energy powers the low power electronics 24, data acquisition interface 26 and low power electrical energy to mechanical force converter 27. Second, they generate information which passes via the data acquisition interface 26 to the low power electronics 24, which information can be processed o compared with information in the memory of the electronic decision making apparatus 24. Thus, as the user taps out a user code he is not only inputting the code but is also generating the energy for processing that code or comparing it with the code stored in memory. Thereafter, operation is like that of FIG. 1*a*.

Alternatively, the energy to operate the electronic decision making apparatus 24 can be generated independently of the energy to operate the electrical to mechanical energy converting means 27, for example by turning a door knob.

The data acquisition interface 26 serves to translate various parameters of the physical world, such as temperature, pressure, displacement, velocity, acceleration, position, tilt, luminescence, conductance, kinetic or potential energy, electrical potential, etc., detected by an appropriate sensor(s) into electrical signals hat can be read by the electronic decision making apparatus 24.

It is necessary to have such a wide spectrum of inputs so that systems can be designed to allow unlocking only when temperature and pressure fall below certain thresholds in the case of specialty locks; to effect gear shifting based on the speed, acceleration and tilt of the bicycle in the case of a bicycle gear box; to choose one of several possible robot arm movements based on the position, tilt, displacement velocity, and the like, of the arm and external environmental parameters such as temperature, pressure, luminesence and the like, in the case of robotics.

All of the electronics can be relatively low power. Complementary metal-oxide-silicon (CMOS) circuits are excellent for this purpose since at low frequency they have extremely low quiescent power consumption. All circuit technologies such as NMOS, PMOS and bipolar low power circuits can also be utilized.

Figure 9:
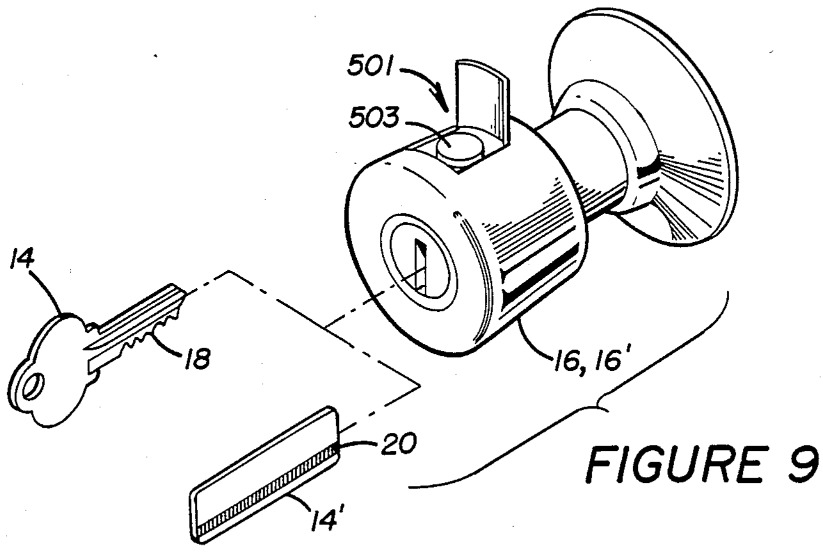
FIG. 9 illustrates an alternate electrical energy generating means useful in the embodiments of the invention.

While the embodiments of FIGS. 1*a* and 1*b* have shown the electrical energy generating means 12 and 12' as generating electricity via dynamo-electric or piezoelectric means it should be noted that electricity can also be generated by other means such as, for example, photovoltaic energy conversion. Energy can be generated photovoltaically, for example, by having insertion of the key 14 or 14' open a window 501 (see FIG. 9) in the lock 16,16' through which light can pass and fall onto a photoelectric cell 503.

It should be noted that the intelligent agency which consciously generates the mechanical motion from which energy is derived by the electrical energy generating means 12 and 12' may be a human, an animal or a robot. Thus, a human putting a key 14 or 14' into a lock, a fish pulling on a fishing line, or a robot performing, for example, an assembly function, all operate via conscious decisions and constitute intelligent agencies.

Referring again to FIG. 1*a*, line 32 represents mechanical energy applying means for applying mechanical energy to accomplish a desired result when the gate 28 is in the selected one of its positions. For example, when the gate 28 is in the selected position the user may be enabled to turn a knob or lever to open a door.

FIGS. 2 and 3*a*–3*d* illustrate particular mechanical energy applying means 32 in the nature of door opening hardware and which includes a user identification system such as the teeth 18 on the key 14, the magnetic coating strip 20 on the key 14', or the buttons 30 on the lock 16', in conjunction with the data acquisition interface 26 and the electronic decision making apparatus 24 and its memory. In the embodiment of FIGS. 3*a*–3*d* the output of the electronic decision making apparatus 24 (FIG. 2) either brings together or forces apart two plate electrodes 34*a* and 34*b* separated by a dielectric 36 which is generally on the surface of at least one of the plate electrodes. The electronic decision making apparatus 24 utilizes the low power electrical output therefrom to either charge the plates 34*a* and 34*b* with the same charge or to charge one with a positive charge and the other with a negative charge. When the charge is of the same polarity the plates repel one another. When the charges are different, the plates attract one another. When the plates attract one another the attractive electrostatic force can overcome the weight of the lower electrode 34*b* and, as the upper electrode 34*a* is moved upwardly it brings the lower electrode 34*b* along with it.

Figure 3A:
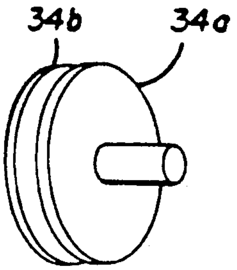
FIGS. 3*a*, 3*b*, 3*c* an 3*d* illustrate, in partial view, in perspective, partially cut away, details in the construction of the embodiment in accordance with the present invention.
Figure 3D:
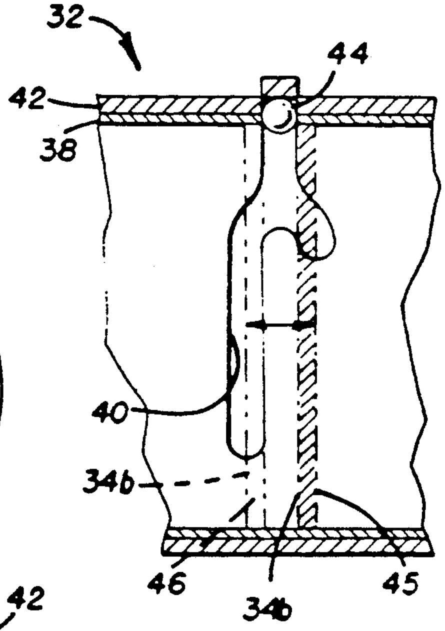
Figure 3B:
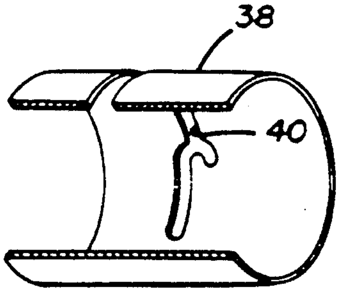
Figure 3C:
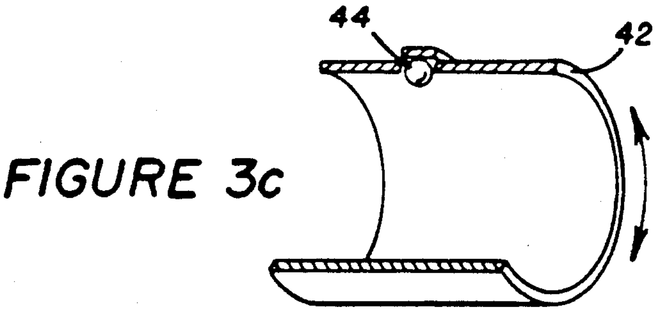

FIG. 3*a* shows the same plate electrodes rotated 90° so that their flat surfaces are vertical. The plate electrodes 34*a*, 34*b* are located within a fixed tube 38 with a slot 40 cut along its midsection (FIG. 3*b*). The tube 38 is in turn located within another rotatable tube 42 (FIG. 3*c*). The tube 42 has a ball bearing 44 inserted in it. The tubes 38 and 42 form a bearing system which is designed in such a way that the ball bearing 44 is constrained to travel, as tube 42 rotates around tube 38, along slot 40.

The plate electrode 34*a* and the tube 42 are mechanically coupled to the handle or door knob of the lock 16 or 16' in such a way that as the handle or the door knob is turned the tube 42 rotates and the plate electrode 34*a* travels along the axis perpendicular to its flat surfaces. The sequence of events leading to unlocking the door is as follows. At rest, the plate electrode 34*a* is pressed against the plate electrode 34*b* with a spring (not shown) to achieve maximum surface contact. When the user inserts a key into a key way or pushes appropriate push buttons, part of the mechanical energy is converted into electrical energy to power the electronic decision making apparatus 24. The electronics processes the key code or the push button sequence to determine whether to unlock or stay locked. As the user turns the handle or the door knob in an effort to gain access, the mechanical energy of the first part of the handle or knob turning is converted into electrical energy and, depending on the result of the electronic data processing, charges of either the opposite polarity (in the case of unlocking) or the same polarity (in the case of staying locked) are dumped onto the plate electrodes 34a and 34b. In the former case the plate electrode 34b is dragged along by the plate electrode 34a as the plate electrode 34a travels to the right as a result of the handle or door knob being turned. The plate electrode 34b eventually ends up at position 45 as shown in FIG. 3d. In the meantime, the tube 42 has been continuously rotating as a result of the handle or door knob being turned. The ball bearing 44 in most part of its travel does not protrude beyond the inner surface of the tube 38, but does so soon after the plate electrode 34b has arrived at its final position. As the ball bearing 44 travels on it soon arrives at a branching point of the slot 40. The tolerance of the design, with the plate electrode 34b at position 45, only allows the ball bearing 44 to travel along the lefthand branch of the slot 40. Further turning of the handle or the door knob beyond this point activates the unlatching mechanism of the lock.

In the latter case, charges of the same polarity help the plate electrode 34a to break away cleanly from the plate electrode 34b as the plate electrode 34a travels to the right. The ball bearing 44, as it arrives at the branching point along the slot 40, finds the plate electrode 34b at position 46 and is forced to take to the righthand branch of the slot 40 because of design tolerance. Since the righthand branch of the slot 40 soon turns into a dead end, the ball bearing 44 can no longer travel on. This in turn stops the tube 42 from rotating further, which in turn stops the handle or door knob of the lock from turning further. The unlatching mechanism does not activate and the lock remains locked up.

It will be noted that energy in the above situation is generated not only by such an action as insertion of a key 14 or 14' or pushing upon buttons 30, but is also generated by the turning of the door knob. This provides a significantly greater source of energy. In case the handle or the door knob is turned without first inserting a key or pushing the push buttons, the situation is similar to that of not having the correct key or code described above, and the same sequence of actions leads to the lock remaining locked.

Figures 4A, 4B:
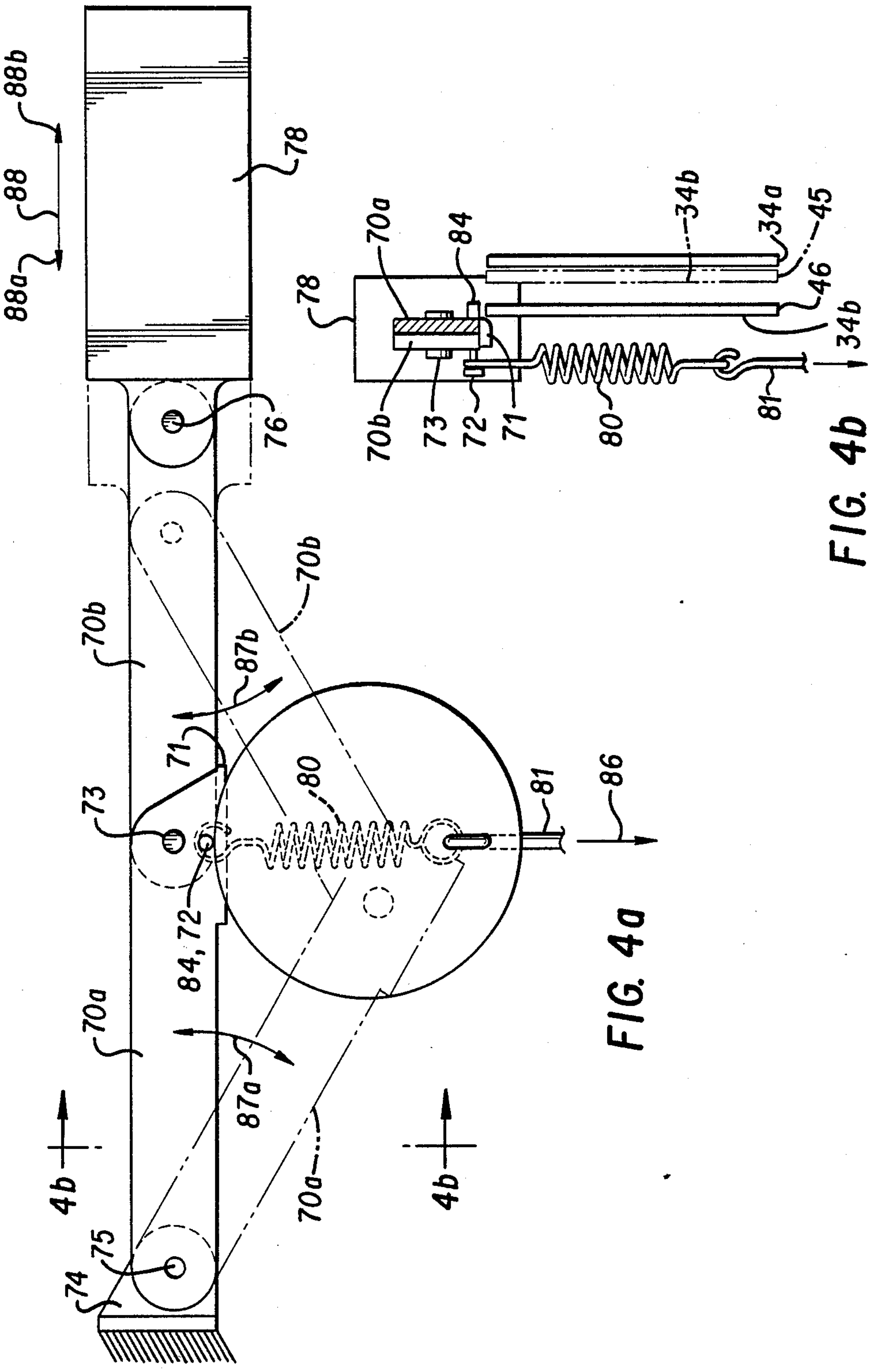
FIGS. 4*a* and 4*b* illustrate, in side and end views, respectively, still another embodiment of the present invention.

FIGS. 4a and 4b considered in conjunction with 3d illustrate still another embodiment of the invention. A deadbolt 78 is attached to a metal bar 70b through a hinge 76, the metal bar 70b is attached to a metal bar 70a at a hinge 73 and the metal bar 70a is attached to part of the stationary lock hardware 74 via a hinge 75. A protrusion 71 of the metal bar 70a prevents it from rotating counterclockwise beyond a point at which the protrusion 71 comes into contact with the metal bar 70b. The deadbolt 78 is further constrained by design to travel only linearly in the direction 88. The metal bars 70a and 70b are constrained so as to move (rotate) in the directions 87a and 87b, respectively.

Identical to the descriptions of other embodiments, the output of the electronic decision making apparatus causes the plate electrode 34b to take the position 46 (in case of staying locked) or 45 (in case of unlocking). Only after that, does the pin 81, which is mechanically coupled to the door knob, start to travel in the direction 86 in an effort to pull down the hinge 73 via a spring 80 and a pin 72, which is an integral part of metal bar 70b. Shortly after that the full mechanical force applied to the door knob is brought to bear on pulling the deadbolt 78 back along the direction 88a.

If the plate electrode 34b is at position 45 (unlocking), the hinge 73 is free to be pulled down by the pin 81 via the spring 80 and pin 72 to allow the retraction of the deadbolt 78 along the direction 88a. On the other hand, if the plate electrode 34b is at position 46 (staying locked), the hinge 73 cannot be pulled down because pin 84, which is an integral part of metal bar 70a, hits the top of the plate electrode 34b and subsequent further application of force in turning the door knob will not be able to retract the deadbolt 78 along the direction 88a.

Metal bars 70a and 70b can be designed to assume almost 0° alignment in the latter (staying locked) scenario so that as long as the hinges 73, 75 and 76 hold, the force needed to force the retraction of the deadbolt 78 would be the same as that of the breaking point of either of the metal bars, 70a and 7Ob.

Figure 5:
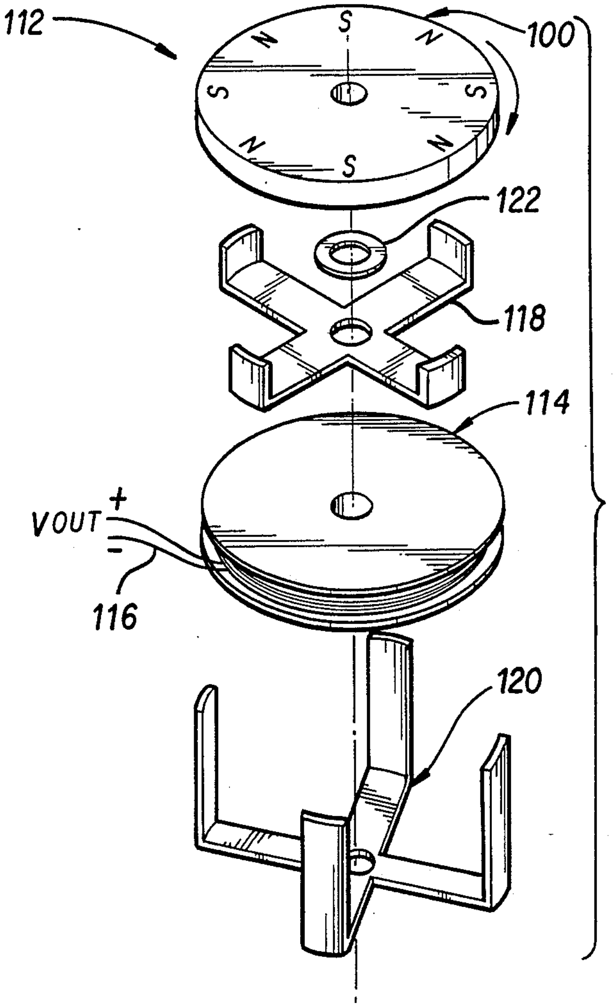
FIG. 5 illustrates, in expanded perspective view, details in the construction of an electric generator useful in the embodiments of the invention.
Figure 10:
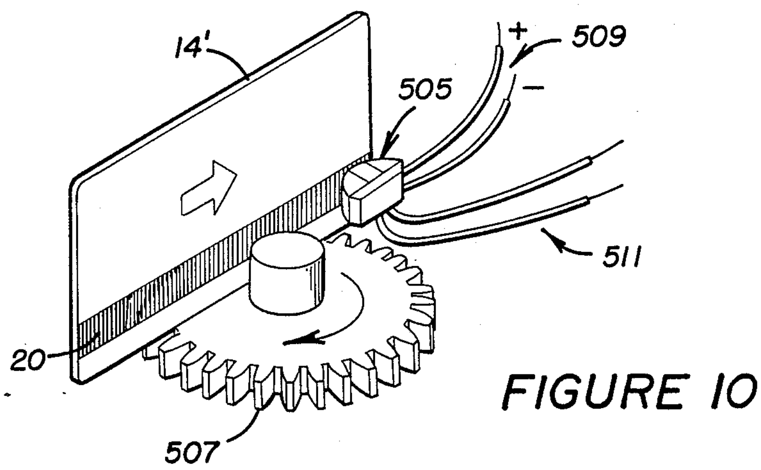
FIG. 10 illustrates a mechanical embodiment for powering a generator of the nature shown in FIG. 5.

A dynamo-electric generator 112 which can be used to generate electrical energy is shown in FIG. 5. The dynamo-electric generator 112 comprises a flat, round bobbin 114, wound with magnet wire 116, sandwiched between two ferromagnetic sheet metal crosses 118 and 120. The crosses 118,120 are bent at the ends and are riveted together so that they form a single ferromagnetic component through which magnetic flux can flow. The bent ends of the crosses 118 and 120, sticking above and beyond the top surface of the bobbin 114, form the boundary of a circular well flanked by eight ferromagnetic poles. In this well, mounted for spinning around a shaft (not shown) on a washer-bearing 122, is an eight-pole ceramic ring magnet 100 magnetized into north and south poles alternately along the circumference. Step-up gears including gear 507 of FIG. 10 are used to translate the mechanical energy, for example, in pushing in the key 14 or 14' and/or in turning door knob, into fast one-way spinning of the magnet 100 (around 50 turns per second), for example, by frictional contact with its periphery.

Figure 6:
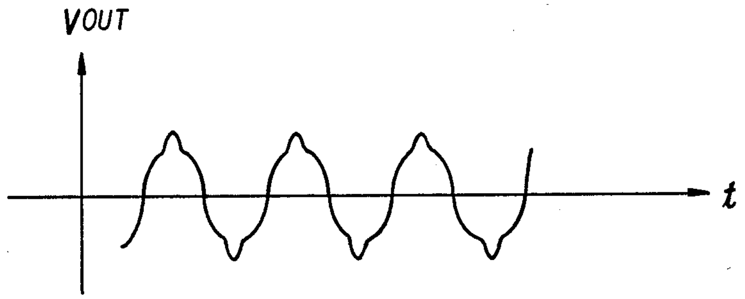
FIG. 6 illustrates the output of the generator of FIG. 5.

As the magnet 100 spins, the two groups of sheet metal poles change magnetic polarity once for every 45° turn of the magnet 100 and this flux change cuts through the magnet wire winding 116 to generate alternate electric voltage with a waveform shown in FIG. 6. When the AC voltage on the magnet wire terminals is rectified through a full-wave rectifier to charge a 1,000 microfarad capacitor, one consistently gets, from a single turning of the door knob, more than 10V across the capacitor. Stronger magnets, a more efficient magnetic pole design to reduce the "air gap" between poles, increasing the number of pole changes per magnet revolution by having a ring magnet magnetized with eight pairs (instead of four) of poles (with a different configuration), better bearings and gears, etc., lead to significant increases in output energy.

An alternative way of generating electrical energy is via piezoelectric means. Commercially available piezoelectric gas igniters may be readily adapted to such use. The igniter comprises a piezoelectric ceramic plug and a metal hammer driven by a spring-loaded trigger. As a push-button is pressed it cocks the trigger and releases the hammer with great velocity. Upon impact the piezoelectric ceramic plug emits a short pulse of electrical energy with such high voltage (in the order of tens of kilovolts) that arcing results when the electrodes are brought close together. Using a high breakdown half-wave rectifier to capture the charge in the positive going half of this pulse and store it across a load capacitor of 0.1 microfarads, one consistently obtains a voltage exceeding 20 V across the capacitor with one triggering. This amount of electrical energy is more than sufficient to power the low power electronic decision making apparatus 24, the data acquisition interface 26 and the low power electrical energy to mechanical force converter 27 in FIGS. 1*a* and 1*b*.

ALTERNATE ELECTROSTATIC EMBODIMENT

Figure 7A:
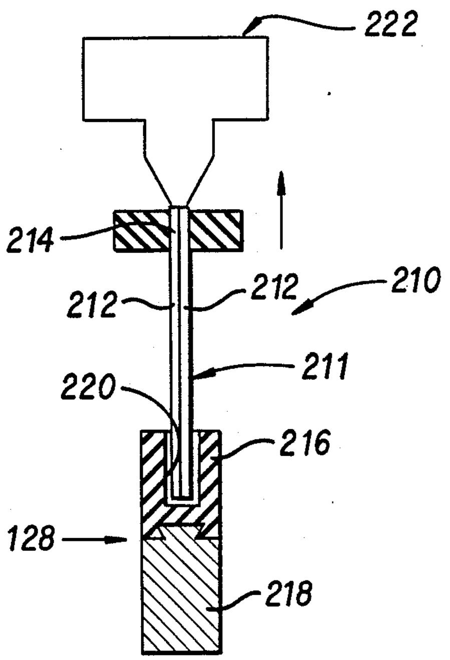
FIGS. 7*a*, 7*b* illustrate, partially schematically and partially in section, and FIG. 7*d* in perspective, an alternate embodiment of the invention.
Figure 7B:
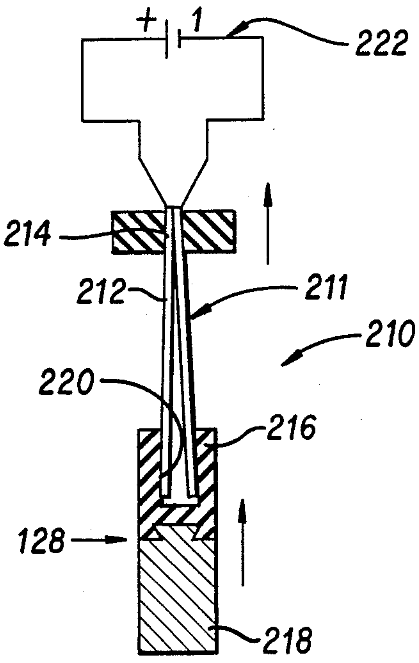
Figure 7C:
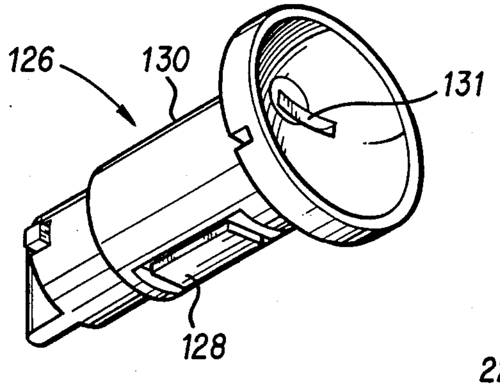
FIG. 7*c* illustrates a lock plug including the embodiment of FIGS. 7*a*, 7*b* and 7*d;*
Figure 7D:
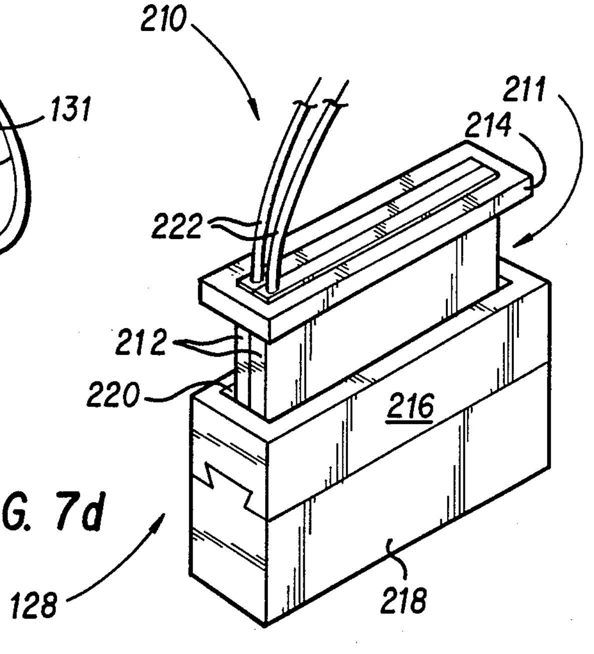

One preferable electrostatically activated gating mechanism 210 is shown in FIGS. 7*a*, 7*b* and 7*d*. It behaves electrically like a capacitor: charge is dumped across the capacitor-like electrodes to effect the gating action and as long as the charge remains (until it leaks away or is shorted to ground) the electromechanical gating mechanism 210 stays functional.

The electrostatic plates or plate electrodes 34*a*,34*b* used in the embodiment of FIGS. 2 and 3*a*–3*d* is such a device. The electrostatic plates 34*a*,34*b* are however rather difficult to make since they require very high polish, flatness and cleanliness.

Piezoelectric devices are alternative and preferred electrostatic devices for converting mechanical energy into electrical energy and vice versa. A bimorph consists of two laminated piezoelectric strips such that when voltage is applied one strip lengthens while the other shrinks, resulting in flexure.

FIGS. 7*a*, 7*b* and 7*d* show a bimorph structure 211 made of two back-to-back bimorphs 212 clamped together at one end 214, and a locking bar 128 consisting of a member 216 made of insulating material and a metal member 218. A slot 220 slightly wider (say, by one thousandth of an inch) than the width of the bimorph structure 211 is in the insulating member 216 of the locking bar 128 and the bimorph structure 211 is inserted into the slot 220.

In the quiescent mode when no voltage is applied, (as shown in FIG. 7*a*) in which circuit 222 is short-circuited, if the bimorph structure 211 is raised (in the direction shown by the arrow) the locking bar 28 stays where it is, with the bimorph structure 211 sliding freely in the slot 220.

However when a large enough voltage is applied (as shown in FIG. 7*b* in which circuit 222 contains a voltage source) flexure of the back-to-back bimorph structure 211 results in forking at its bottom end. This causes binding of the bimorph structure 211 with the locking bar 128. As the bimorph structure 211 is raised, the locking bar 128 is lifted by it because of the binding. The gating function is the binding of the bimorph structure 211 to the slot 220. The lifting force can be provided, for example, by the turning of a door knob.

The insulating member 216 of the locking bar 128 ensures that the charge across the bimorph structure 211 does not leak away. The metal member 218 of the locking bar 128 is used to engage or disengage the inside wall of the cylindrical hole in the steering column of an automobile, as in the case of an ignition lock plug shown in FIG. 7*c*, which is to be explained later, or the latch bolt of a door lock to effect locking and unlocking in the manner illustrated elsewhere, e.g., in FIGS. 3*b*–3*d* or 4*a*–4*b*.

FIG. 7*c* shows an ignition lock plug 126 used in many General Motors car models over many years. A locking bar 128 (equivalent to the mechanical gate 28 in FIGS. 1*a* and 1*b* in a cylindrical casing 130 stays in the locked position (away from the center of the plug 126) when no key or a wrong key has been inserted into the keyway 131. When the right key has been inserted the locking bar 128 pops into an "unlocked" position (towards the center of he plug 126). With the ignition lock plug 126 fitted inside a cylindrical hole in the steering column, this minute, in-and-out displacement of the locking bar 128 (in the order of 30 to 40 thousandths of an inch) is sufficient to effect locking and unlocking that protect millions upon millions of automobiles.

FIG. 7*d* illustrates use of the electrostatically activated gating mechanism 210 with the ignition lock plug 126 of FIG. 7*c*. For clarity, only the electrostatically activated gating mechanism 210 is illustrated.

Figure 8A:
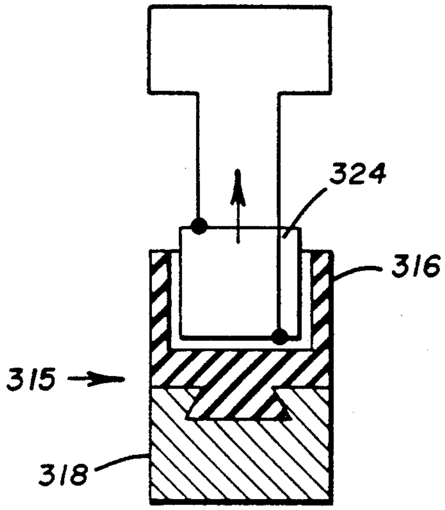
FIGS. 8*a* and 8*b* illustrate, partially schematically and partially in section, an alternate embodiment in accordance with the invention.
Figure 8B:
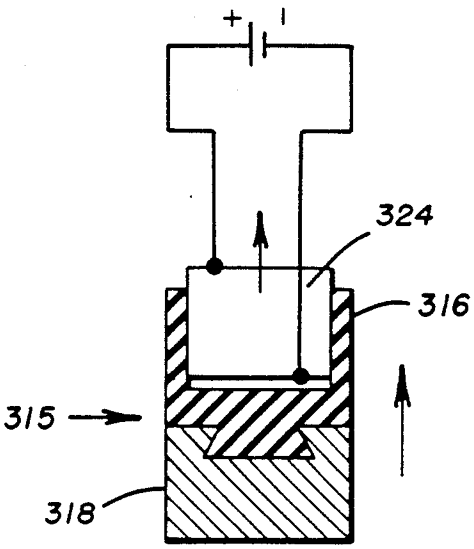

FIGS. 8 and 8*b* show a similar construction with a cylindrical piezoelectric block 324 instead of the bimorph structure 211. The diameter of the cylinder 324 undergoes changes when voltage is applied to it. This phenomenon is used to cause the same "binding" effect (as illustrated in FIG. 8*b*) described above to raise a locking bar 318.

There are many other ways in which piezoelectric devices can be used in locks, e.g., in FIGS. 7*a*, 7*b* and 7*d* one of the bimorphs 212 in the bimorph structure 211 can be replaced by a strip of ordinary ceramic or some other material; the binding action can be replaced by movement of latches or the like. A common denominator of these devices is that the initial physical displacement or flexure is in general quite small.

Since these piezoelectric devices have extremely low leakage, they do not load down the power generator in any appreciable way. The power requirement is so low that a piezoelectric generator, which generates electrical power orders of magnitude smaller than that of a dynamo-electric type as shown in FIG. 5, is all it needs to operate. This low power domain is far, far beyond the reach of any electromagnetic devices, such as electromagnets, relays and solenoids.

Once the voltage is applied across the piezoelectric device, for example, by a charged-up capacitor, the device functions as long as the capacitor stays charged. This means that once the electronic decision making apparatus 24 in the system has activated the piezoelectric device, the lock can stay unlocked for many minutes, even many hours. The voltage can of course be readily removed after the lock has been unlocked by closing a switch across the charged-up-capacitor voltage source.

Other important advantages of using these piezoelectric devices are: (1) the lock is not vulnerable to vibration caused by hitting the lock with a hammer, (2) a piezoelectric generator can be activated with very little force and operates quietly, whereas dynamo-electric generators need much more force to operate and generate a lot of noise, (3) piezoelectric generator does away with all the springs and intricate gearings needed in dynamo-electric generators, resulting in cost reduction and (4) the lock is more reliable because of having fewer moving parts.

INDUSTRIAL APPLICABILITY

An electrostatically activated gating mechanism 10 in accordance with the present invention finds use in systems that can serve as a door lock, can provide automatic gear shifting for bicycles as by detecting slope, speed or the like, can provide an intelligent drag system for fishing reels, can provide power for running of electronic cash registers or slot machines and for various electro-mechanical toys in the absence of electrical power or batteries.

There are numerous other instances where it would be desirable to have a system which operates on user generated power and provides a control or gating function.

While the invention has been described in connection with certain preferred embodiments thereof it will be obvious that modification and changes may be made in the invention by those skilled in the art to which it pertains without departing from the scope of the invention as defined by the appended claims.

I claim:

1. An electrostatically activated gating mechanism, comprising:
- mechanical motion detecting means for detecting mechanical motion consciously generated by an intelligent agency;
- electrical energy generating means for generating electric energy in response to and utilizing energy derived from said mechanical motion detected by said mechanical motion detecting means;
- an electronic decision making apparatus solely powered by the electrical energy generated by the electrical energy generating means, the decision making apparatus being adapted to receive information, to make one of a set of possible decisions based thereon, and to generate a specific low power electrical output in response to a selected one of said set of possible decisions being made;
- a mechanical gate having at least two positions; and
- electrical to mechanical energy converting means for electrostatically converting said low power electrical output into a minute mechanical force/movement and for applying said minute mechanical force/movement to position said gate in a selected one of said positions.

2. An electrostatically activated gating mechanism as set forth in claim 1, wherein said electrical energy generating means generates energy via a selected one of piezoelectric, dynamo-electric or photovoltaic energy conversion.

3. An electrostatically activated gating mechanism as set forth in claim 1 wherein said intelligent agency is a selected one of a human, an animal and a robot.

4. An electrostatically activated gating mechanism as set forth in claim 1 further including:
- mechanical energy applying means for applying mechanical energy to accomplish a desired result when said gate is in said selected one of said positions.

5. An electrostatically activated gating mechanism as set forth in claim 4, wherein said gating mechanism is used in conjunction with door opening hardware which includes user identification system which serves as said electrical energy generating means and which includes said electronic decision making apparatus.

6. An electrostatically activated gating mechanism as set forth in claim 5, wherein said mechanical motion is the motion of a key being pushed into a lock and wherein said electronic decision making apparatus receives information identifying said key and generates said low power electrical output only when said key satisfies certain criteria defined by said electronic decision making apparatus.

7. An electrostatically activated gating mechanism as set forth in claim 6, wherein said key includes electromagnetic or optical coding thereon carrying said identifying information.

8. An electrostatically activated gating mechanism as set forth in claim 6, wherein said key includes mechanical coding thereon carrying said identifying information.

9. An electrostatically activated gating mechanism as set forth in claim 5, wherein said user identification system includes a data entry input whereat a user can enter said identifying information and simultaneously generate said electrical energy.

10. An electrostatically activated gating mechanism as set forth in claim 1, wherein said electronic decision making apparatus includes a non-volatile memory.

11. An electrostatically activated gating mechanism as set forth in claim 10, further including:
- data acquisition means for acquiring data; and
- data transmission means for transmitting data acquired by said data acquisition means to said electronic decision making apparatus.

12. An electrostatically activated gating mechanism as set forth in claim 1, further including:
- data acquisition means for acquiring data; and
- data transmission means for transmitting data acquired by said data acquisition means to said electronic decision making apparatus.

13. An electrostatically activated gating mechanism as set forth in clam 1, wherein said electrical to mechanical energy converting means includes a piezoelectric member which is deformable on being charged and charge applying means for selectively applying a charge thereto.

14. An electrostatically activated gating mechanism as set forth in claim 13, wherein said piezoelectric member comprises a bimorph.

15. An electrostatically activated gating mechanism as set forth in claim 13, wherein said electrical energy generating means generates energy via piezoelectric energy conversion.

16. An electrostatically activated gating mechanism as set forth in claim 13, wherein said gating mechanism is used in conjunction with door opening hardware which includes a user identification system which serves as said electrical energy generating means and which includes said electronic decision making apparatus.

17. An electrostatically activated gating mechanism as set forth in claim 16, wherein said mechanical motion is the motion of a key being pushed into a lock and wherein said electronic decision making apparatus receives information identifying said key and generates said low power electrical output only when said key satisfies certain criteria defined by said electronic decision making apparatus.

18. An electrostatically activated gating mechanism as set forth in claim 17, wherein said key includes electromagnetic or optical coding thereon carrying said identifying information.

19. An electrostatically activated gating mechanism as set forth in claim 17, wherein said key includes mechanical coding thereon carrying said identifying information.

20. An electrostatically activated gating mechanism as set forth in claim 16, wherein said user identification system includes a data entry input whereat a user can enter said identifying information and simultaneously generate said electrical energy.

21. An electrostatically activated gating mechanism as set forth in claim 16, wherein said piezoelectric member comprises a bimorph.

22. An electrostatically activated gating mechanism as set forth in claim 1, wherein said electrical to mechanical energy converting means includes a pair of adjacent electrode plates separated by an insulator and charge applying means for selectively applying the same or opposite charges to said plates.

* * * * *